United States Patent
Goedecke et al.

(10) Patent No.: US 8,932,499 B2
(45) Date of Patent: Jan. 13, 2015

(54) METHOD FOR PRODUCING AN SMC MULTI-LAYER COMPONENT

(75) Inventors: Jens Goedecke, Stuttgart (DE); Karl-Heinz Ilzhoefer, Kirchheim (DE)

(73) Assignee: Daimler AG, Stuttgart (DE)

( * ) Notice: Subject to any disclaimer, the term of this patent is extended or adjusted under 35 U.S.C. 154(b) by 378 days.

(21) Appl. No.: 13/636,394

(22) PCT Filed: Mar. 16, 2011

(86) PCT No.: PCT/EP2011/001278
§ 371 (c)(1),
(2), (4) Date: Sep. 21, 2012

(87) PCT Pub. No.: WO2011/116890
PCT Pub. Date: Sep. 29, 2011

(65) Prior Publication Data
US 2013/0009332 A1   Jan. 10, 2013

(30) Foreign Application Priority Data

Mar. 25, 2010  (DE) .......................... 10 2010 012 870
Apr. 9, 2010   (DE) .......................... 10 2010 014 398

(51) Int. Cl.
*B29C 70/08* (2006.01)
*B29C 44/12* (2006.01)
(Continued)

(52) U.S. Cl.
CPC ........... *B29C 70/086* (2013.01); *B29C 44/1228* (2013.01); *B29C 44/1261* (2013.01); *B29C 33/68* (2013.01); *B29C 44/1233* (2013.01);
(Continued)

(58) Field of Classification Search
None
See application file for complete search history.

(56) References Cited

U.S. PATENT DOCUMENTS 6,630,232 B1   10/2003   Muser et al.

FOREIGN PATENT DOCUMENTS

DE   2307898 A1   9/1974
DE   3126242 A1   1/1983
(Continued)

OTHER PUBLICATIONS

Office Action dated Jan. 28, 2014, in Japanese Application No. 2013-500365 (with English language translation).
(Continued)

*Primary Examiner* — Benjamin Schiffman
(74) *Attorney, Agent, or Firm* — Patent Central LLC; Stephan A. Pendorf

(57) ABSTRACT

Method for producing an SMC multi-layer component in a production process. The component has a sandwich structure. At least one foam material layer (3) is embedded between two SMC cover layers (2, 2'). An insert layer arrangement comprising at least one first and one second SMC semifinished product cover layer (2, 2') is positioned in a press mold comprising a punch (1) and a die (1'). A first and a second SMC semifinished product cover layers (2, 2') are shaped into two SMC cover layers (2, 2') by applying pressure to the layer arrangement. Curing of the first and the second SMC semifinished product cover layers (2, 2') is initiated. The punch (1) and the die (1') are moved away from each other, until the distance provided therebetween corresponds to a thickness of the SMC multi-layer component to be produced. A foaming process of a material (3') that can be foamed, which is provided between the two SMC cover layers (2, 2') is initiated, producing the foam material layer (3). After the foaming has ended, the SMC multi-layer component is removed from the press mold.

10 Claims, 2 Drawing Sheets

Figure 1:
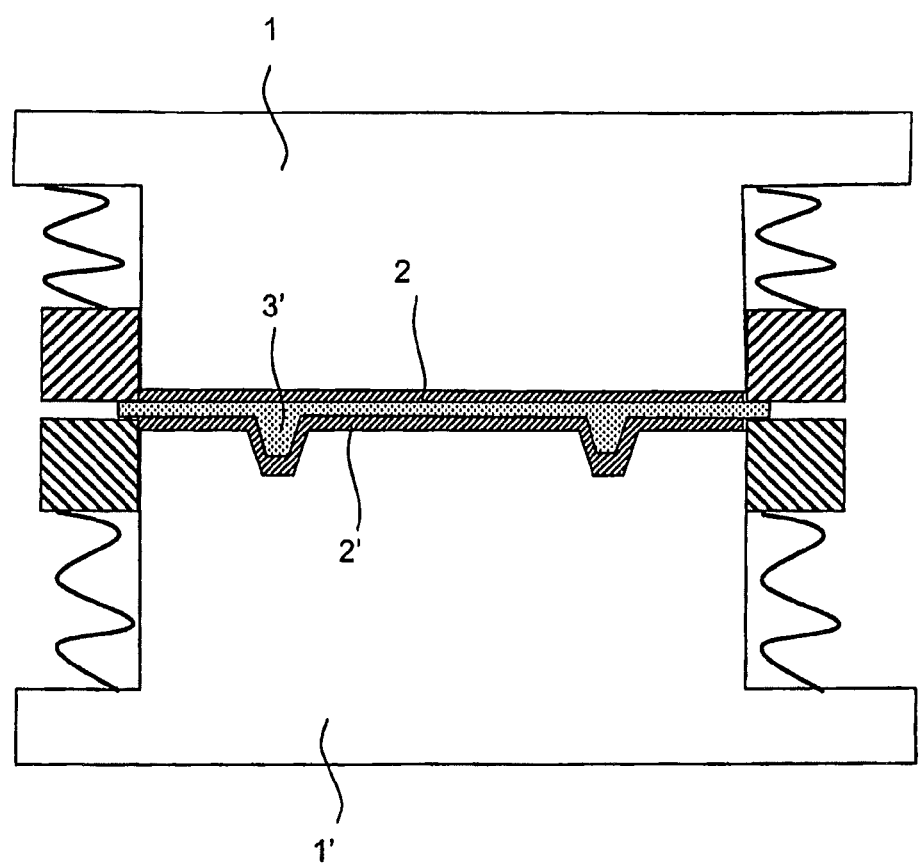

(51) Int. Cl.
*B29C 33/68* (2006.01)
*B29C 44/14* (2006.01)
*B29C 44/58* (2006.01)
*B29C 70/46* (2006.01)
*B29K 33/00* (2006.01)

(52) U.S. Cl.
CPC ............ *B29C 44/146* (2013.01); *B29C 44/586* (2013.01); *B29C 70/46* (2013.01); *B29K 2033/12* (2013.01)
USPC ........................................ 264/46.5; 264/257

(56) References Cited

FOREIGN PATENT DOCUMENTS

| | | | |
|---|---|---|---|
| DE | 19956152 | C2 | 7/2002 |
| DE | 10123176 | A1 | 11/2002 |
| DE | 10123176 | C2 | 8/2003 |
| EP | 2018948 | A1 | 1/2009 |
| JP | 56038262 | A1 | 4/1981 |
| JP | 01163020 | A1 | 6/1989 |
| JP | 03061027 | A1 | 3/1991 |
| JP | 11010656 | A1 | 1/1999 |
| JP | 2009137204 | A1 | 6/2009 |
| WO | 9950059 | A1 | 10/1999 |

OTHER PUBLICATIONS

Office Action dated Apr. 11, 2014, in Chinese Application No. 201180015360.3 (with English language translation).

Reimer, U et al. "One-Step-Sandwich-SMC Verfahren Zur Herstellung Von Leichten Fahrzeugteilen" Kunststoffe, Carl Hanser Verlag, Munich, DE vol. 89, No. 6, Jun. 1, 1999, XP000958172, ISSN: 0023-5563 the whole document.

METHOD FOR PRODUCING AN SMC MULTI-LAYER COMPONENT

The invention relates to a method for producing SMC multi-layer components.

It is common practice to produce lightweight components for use in areas of application, which involve large mechanical loads, from a Duromer composite material system, also known as Sheet Moulding Compound (SMC). Here reaction resins such as polyester- or vinylester resin are mixed with fillers and additives as well as fibres, preferably glass fibres, fed into a mold, for instance a film mold and provided as ready to process, respectively ready to shape semifinished products, which can be further converted into the finished component. The composition makes available lightweight but robust, stable and load-resistant material for producing multi-layer components suitable for car and commercial vehicles, it being necessary in the case of multi-layer components, which include other material layers apart from one or several stabilizing SMC layers, for the layers to be connected with the intermediate layers in complex joining operations.

Multi-layer materials for producing lightweight multi-layer components such as for instance a preform piece for a car roof liner and a corresponding production method are disclosed in German Patent DE 199 56 152 C2. The objective of simplifying the production of multi-layer materials, described there, is achieved by providing a foamed plastic with fibre reinforcement and at least one cover layer, while fixing the joins of the non-woven fabric with a thermoplastic binder and by treating the non-woven fabric with a fluid compound consisting of a foam-forming agent and then feeding through a belt press. The glass temperature of the binder is below a reaction temperature of the foam-forming agent during foaming, this only being applied just before being fed into the belt press, so that the foaming takes place at the desired point in time between the belts. In this case precision is required particularly regarding the point in time when the foam-forming agent is added and re-working of the component may also be necessary.

On the basis of this prior art the objective is to create multi-layer materials with SMC layers in a method which also enables more complex structures to be produced as a finished product in as few as possible time-uncritical processes.

This objective is achieved by a method with the features of claim 1. Further embodiments of the method are detailed in the dependant claims.

A first embodiment of the method relates to producing an SMC multi-layer component in a single production process. In this case the component is created by way of a sandwich structure and comprises a foam material layer between two SMC cover layers.

The method comprises the steps of positioning an insert layer arrangement comprising a first and a second SMC semifinished product cover layer in a press mold, wherein the press mold comprises a punch and a die. Then the first and the second SMC semifinished product cover layer is shaped into two SMC cover layers, with pressure being exerted on the layer arrangement.

After shaping the first and the second SMC cover layers are cured, respectively the curing process is initiated.

During shaping and at least partial curing in the SMC process, the two SMC semifinished product cover layers or the SMC cover layers must not be allowed to connect during the curing process, so that the foam layer lying therebetween can be formed or carry on foaming. This is achieved by release films, separators or the like between the two SMC layers. In particular the molds or the release films are arranged in such a way that they project from the tool geometry. The projection can then be clamped between two rotating retention plates. Thus a separating plane is formed. After at least the outer, close to the tool zones of the SMC cover layers are cured, the foaming process between the SMC cover layers is initiated.

The foaming process comprises the steps of providing a material that can be foamed arranged between the two SMC cover layers and of foaming.

By moving the punch away from the die subsequent to or during the foaming process, the core material is given the space necessary for foaming, until the desired thickness of the SMC multi-layer component is achieved.

The separator between the two SMC layers in this case can also be formed in a preferred embodiment by the material that can be foamed. Release films or the like can then also be dispensed with.

After the foamable material has foamed the finished SMC multi-layer component can be removed from the press mold.

There are essentially two procedures according to the invention, in order to convert the material that can be foamed between the two SMC cover layers after their shaping into a solid foam:

A first procedure consists in that the foamable material provided between the two SMC cover layers is a foamable, dimensionally stable mold, which for instance can be a polyurethane mold and which has already been arranged between the two SMC semifinished product cover layers, before positioning of the insert layer arrangement into the shaping press, and has been positioned with these and inserted in the press mold. The foamable, dimensionally stable mold thereby also fulfills the function of a separator between the two SMC layers. Then the foam process must only be initiated, which when a mold is used can be performed in a particularly easy way by heat being conducted to the foamable mold, for example through heating wires already previously integrated in the mold. Of course other process steps mentioned below are conceivable for initiating the foaming.

In an alternative embodiment the insert layer arrangement between the first and the second SMC semifinished product cover layer can comprise two release film layers which are arranged adjacent to each other but not in a way that they can connect together. These two release film layers ensure that, during the shaping process, the first and the second SMC semifinished product cover layers are prevented from connecting; rather the release film layers are made of a film constituted such that in each case one of the two release film layers is permanently connected with the first and the other with the second SMC semifinished product cover layer. Now at the same time the punch and the die of the press can be moved away from each other, while the foamable material is provided between the two SMC cover layers separated from each other by release film layers, directly after which the foaming is initiated. The foaming material fills the space between the two release film layers, which are connected with the SMC cover layers, cures and therefore the SMC multi-layer component is present in the press mold as a finished product.

In the case of both alternative procedures it can be envisaged that the insert layer arrangement between the first and the second SMC semifinished product cover layer comprises continuous fibres or also long fibres. Fibres are also generally contained in the SMC compound, which as film in the present case constitutes the semifinished product cover layer. Normal SMC compounds contain polymerisable resins in a quantity ranging from approximately 8 to 15%, related to the total weight of the compound, mineral fillers, e.g. chalk or powdered minerals ranging from approximately 38 to 50% and fibrous materials such as for instance glass fibres. Well-known compounds accordingly comprise approximately 30% glass fibres, related to the total weight of the compound. It is also possible to add additives which reduce undesirable shrinking, inhibiters which allow a defined polymerisation of the resins and other additives.

Suitably the film, which constitutes the two release film layers in the case of the second alternative method, will have a fusion temperature, which is above the temperature required for carrying out the shaping of the first and the second SMC semifinished product cover layer into the SMC cover layers.

The foamable material can be introduced between the two release film layers by appropriate means, comprising a suitable injection nozzle. The foam, which arises from the foamable material after the foaming is initiated, permanently adheres to the release film layers, which are again permanently connected with the SMC cover layers.

In the first embodiment, in which the foam is provided between the two cover layers through the foamable mold, this is likewise directly and permanently connected with the SMC cover layers.

While in the embodiment involving the foaming of a mold, heat- or resistance wires already integrated in the mold for initiating a temperature rise, which results in the foaming process, can be used, for initiating foaming processes in the case of foamable material to be injected, methods for initiating the foaming such as heat generation from the outside, thermal conductance, transmission of energy into the foaming material by using microwaves, ultrasonic waves or also photochemical processes can be selected.

In both alternative embodiments in one work step anyhow a precision-made lightweight component is produced whose internal foam layer is covered by exactly shaped SMC cover layers in the way of a sandwich which permanently holds the foam therebetween, so that connecting, respectively joining operations, for instance splicing and bonding are superfluous.

These and other advantages are demonstrated by the following description under reference to the accompanying figures.

Figure 2:
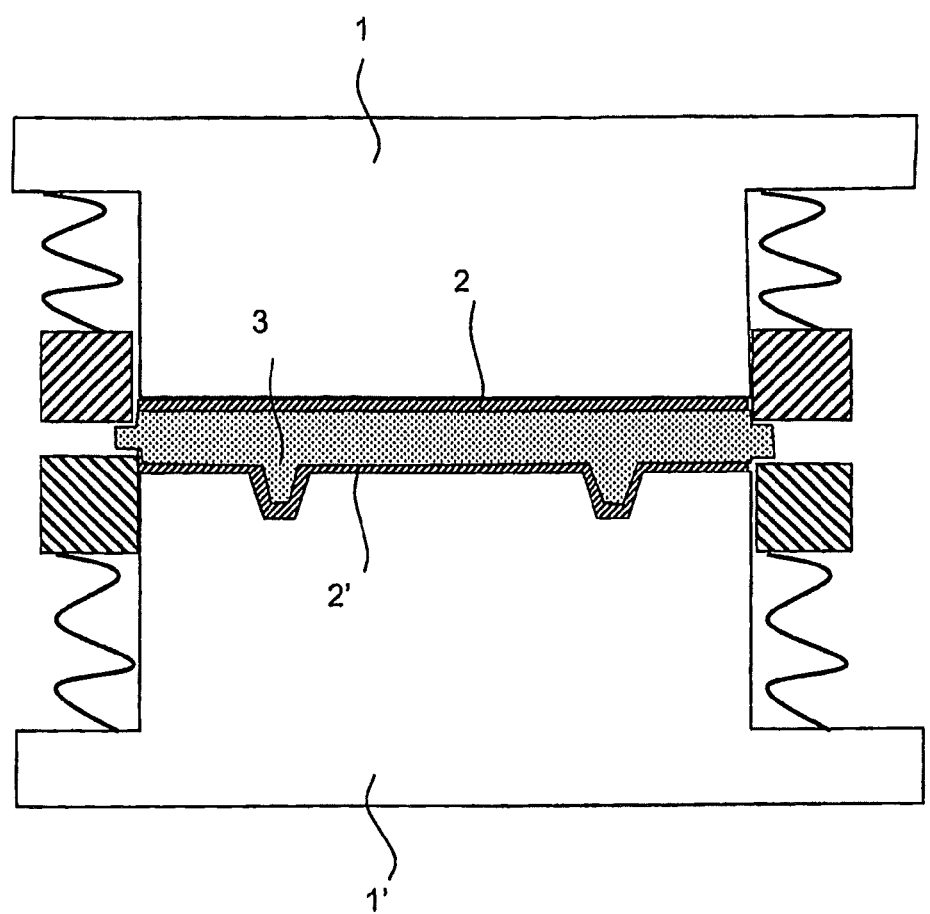

The reference to the figures in the description serves to support the description and easier understanding of the subject matter. Subject matters or sections of subject matters, which are essentially identical or similar, may be provided with the same reference symbols. The figures are only a schematic illustration of one embodiment of the invention. Wherein:

FIG. 1 shows a cross-sectional view of an inventive SMC multi-layer structure in a press before foaming of the foam-forming material layer, FIG. 2 shows a cross-sectional view of an inventive SMC multi-layer structure in a press after foaming of the foam-forming material layer.

Basically the inventive method relates to producing an SMC multi-layer component in a single production process, which is performed in a press mold. Here it does not concern a belt press. The component is created by way of a sandwich structure and has a foam material layer, which is embedded between two SMC cover layers. The inventive method for creating the SMC multi-layer component comprises the step of positioning an insert layer arrangement, which consists of at least two SMC semifinished product cover layers, in a press mold, which is suitably equipped with a punch and a die. Now the first and the second SMC semifinished product cover layers are each shaped into a SMC cover layer in the desired final geometry, which is achieved by making the SMC material flow under pressure. The SMC material cures due to the thermal effect of the heated tool. The curing process does not have to be fully completed here. It is sufficient to harden the SMC cover layers only to such an extent that they survive the opening of the press mold and introduction of the foamable material without damage. Final curing can then take place together with foaming of the foamable material. Thus an SMC cover layer is produced from each of the two SMC semifinished product cover layers. The press mold components comprising punch and die can now be moved away from each other, until the distance provided therebetween is sufficiently large in order to give the desired space to a foam material layer between the two SMC cover layers. If a foamable material is provided between the two SMC cover layers, the foamable material can be foamed by initiating a foaming process and the space achieved by moving die and punch away from each other can be filled in. As soon as the foaming is complete, the finished SMC multi-layer component can be removed from the press mold.

Such a press mold is illustrated in FIGS. 1 and 2; there the inventive method is performed by the embodiment using a foamable, dimensionally stable mold. The foamable mold 3', see FIG. 1, is already arranged perfectly between the two SMC semifinished product cover layers 2, 2', before these are positioned as insert layer arrangement in the press mold. The foamable mold 3' lies between the SMC semifinished product cover layers, while these are shaped by applying corresponding pressure.

If punch 1 and die 1' are now moved away from each other, as illustrated in FIG. 2, and the foaming process is initiated, the mold 3' expands and forms the foam material layer 3, which completely fills in the space between the two cover layers 2, 2'.

The foam thereby permanently adheres to the sides, facing it, of the SMC cover layers, so that bonding or connecting the foam together with the cover layers in another way is superfluous and in this respect no further connection processes between foam and cover layers are required. The foaming, not shown figuratively, can be initiated through heating wires, already integrated in the foamable mold, which are connected to a suitable source of heating.

Furthermore it is conceivable that the foam reaction is initiated by process-integrated thermal conduction.

Basically however other reaction mechanisms to initiate the foaming are also conceivable, for instance the transmission of energy in the form of micro- or ultrasonic waves, temperature increase through resistance-heaters or wires integrated in the foam mold or photochemical reaction mechanisms.

Not illustrated figuratively is the alternative method, in which film layers are arranged between the two SMC layers, in order to ensure that the two SMC semifinished product cover layers, during and after the shaping- or curing process, cannot directly connect with each other. The release films are configured in such a manner that the sides, facing the SMC layers, during the cure process after shaping of the same permanently adhere to the SMC material. At the same time the films are temperature-resistant in such a manner that they are not damaged during the SMC shaping process. As soon as the SMC cover layers are formed and cured, foamable materials can be introduced between the two release films, through suitably arranged injection nozzles while the punch is moved away from the die of the corresponding press mold. At the same time punch and die can be moved away from each other up to a desired distance and create a cavity which can be filled with foam. The injected, foamable material permanently adheres during the foaming process to the release film layers, which are again permanently connected with the SMC cover layers. After the foam layer is left to cure the component can also be removed here.

Thus both of the aforementioned alternative methods for producing an SMC multi-layer component constitute rapid and precision production processes, as the result of which costs and time-consuming re-working of the component due to joining operations are superfluous.

The invention claimed is:

1. A method for producing an SMC multi-layer component in a production process, wherein the component has a sandwich structure and at least one foam material layer (3) is embedded between two SMC cover layers (2, 2'), comprising the steps of
  a) positioning an insert layer arrangement comprising at least one first and one second SMC semifinished product cover layer (2, 2') in a press mold comprising a punch (1) and a die (1'),
  b) shaping a first and a second SMC semifinished product cover layer (2, 2') into two SMC cover layers (2, 2') by applying pressure to the layer arrangement, and
  c) initiating the curing of the first and the second SMC semifinished product cover layer (2, 2'),
  d) moving the punch (1) and the die (1') away from each other, until the distance provided therebetween corresponds to a thickness of the SMC multi-layer component to be produced,
  e) initiating a foaming process of a material (3') that can be foamed, which is provided between the two SMC cover layers (2, 2') and producing the foam material layer (3) and
  f) after the foaming has ended removing the SMC multi-layer component from the press mold, wherein
    the insert layer arrangement between the first and the second SMC semifinished product cover layer (2, 2') comprises two release film layers which are arranged adjacent to each other and cannot be connected together, and
    during shaping of the first and the second SMC semifinished product cover layer (2, 2') into the two SMC cover layers (2, 2') the first of the two release film layers is permanently connected with the first SMC cover layer (2) and the second release film layer with the second SMC cover layer (2'), and
    the foamable material (3') provided between the two SMC cover layers (2, 2') is injected between the two release film layers, while the stamp (1) and the die (1') are moved away from each other.

2. The method according to claim 1, wherein the material (3') that can be foamed, which is provided between the two SMC cover layers (2, 2') is a foamable, dimensionally stable material (3'), and wherein the material (3') that can be foamed before positioning the insert layer arrangement has been placed in a press mold between the two SMC semifinished product cover layers (2, 2').

3. The method according to claim 2, wherein the material (3') that can be foamed, which is provided between the two SMC cover layers (2, 2') is a polyurethane material.

4. The method according to claim 2, wherein a film for constituting the two release film layers has a fusion temperature which is above a temperature required for carrying out the shaping of the first and of the second SMC semifinished product cover layer (2, 2') into the two SMC cover layers (2, 2').

5. The method according to according to claim 1, wherein the insert layer arrangement between the first and the second SMC semifinished product cover layers (2, 2') comprises continuous fibers or long fibers.

6. The method according to claim 1, wherein initiating the foaming of the material that can be foamed (3') is provided by heat generation, thermal conductance or by transmission of energy into the material that can be foamed.

7. The method according to claim 6, wherein initiating the foaming of the material that can be foamed (3') is provided by using microwaves or by ultrasonic waves.

8. The method according to claim 6, wherein the foaming of the foamable material (3') is initiated by heat input by means of heating wires integrated in the material (3).

9. The method according to claim 1, wherein steps d) and e) are performed at the same time.

10. The method according to claim 1, wherein full curing of the first and the second SMC semifinished product cover layer (2, 2') is only completed in step e).

* * * * *